United States Patent
Rasmussen et al.

(10) Patent No.: US 9,781,497 B1
(45) Date of Patent: Oct. 3, 2017

(54) INTEGRATED COSMETIC AUDIO DRIVER

(71) Applicant: Apple Inc., Cupertino, CA (US)

(72) Inventors: Timothy J. Rasmussen, Sunnyvale, CA (US); Ian P. Colahan, Mountain View, CA (US); Trevor M. Cardiff, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/084,403

(22) Filed: Mar. 29, 2016

(51) Int. Cl.
  *H04R 1/02* (2006.01)
  *H04B 1/3888* (2015.01)

(52) U.S. Cl.
  CPC ............. *H04R 1/02* (2013.01); *H04B 1/3888* (2013.01)

(58) Field of Classification Search
  CPC ......... H04R 1/02; H04R 1/025; H04B 1/3888
  See application file for complete search history.

(56) References Cited

U.S. PATENT DOCUMENTS

| | | | | |
|---|---|---|---|---|
| 8,126,138 B2* | 2/2012 | Dinh | ....................... | H04M 1/03 379/433.02 |
| 2014/0187289 A1* | 7/2014 | Cataldo | .................. | H05K 13/00 455/557 |
| 2015/0117679 A1* | 4/2015 | Wang | ........................ | H04R 1/02 381/162 |
| 2016/0315652 A1* | 10/2016 | Tabatabai | ................ | H04M 1/03 |
| 2016/0360313 A1* | 12/2016 | Mikalauskas | .......... | H04R 7/045 |
| 2017/0026498 A1* | 1/2017 | Goldfain | ............. | H04M 1/0249 |

FOREIGN PATENT DOCUMENTS

GB    2508364 A  *  6/2014   ........... H04B 1/3888

\* cited by examiner

*Primary Examiner* — Brenda Bernardi
(74) *Attorney, Agent, or Firm* — Downey Brand LLP

(57) ABSTRACT

An accessory device suitable for use with an electronic device is disclosed. The electronic device may include an audio assembly designed to generate acoustical energy. The audio assembly may use certain components of the accessory device to generate the acoustical energy. For example, the accessory device may include a shell, or rigid body, that provides structural support for the accessory device. The accessory device may also include a flexible layer, such as silicone, disposed over the shell. The audio assembly may use part of the shell and acoustically drive that part of the shell to generate the acoustical energy. Further, the audio assembly may use part of the flexible layer as a "surround" to allow part of the shell to move relative to other parts. The electronic device may electrically couple with the accessory device, thereby providing a means for providing an audio signal.

20 Claims, 10 Drawing Sheets

INTEGRATED COSMETIC AUDIO DRIVER

FIELD

The described embodiments relate to accessory devices used with electronic device. In particular, the described embodiments relate to an accessory device having an audio driver (speaker) capable of transmitting an audio signal from an electronic device in communication with the accessory device.

BACKGROUND

In order to provide a protective cover, an accessory device can be used to secure an electronic device. Accessory devices may fit over an enclosure region of the electronic device and provide protection against a force or load to the electronic device when, for example, the electronic device is dropped.

SUMMARY

In one aspect, an accessory device configured to carry an electronic device and generate acoustical energy is described. The accessory device may include a shell configured to carry the electronic device. The shell may include a body. The accessory device may further include a coil coupled with the body and configured to receive a varying electrical current to form an electromagnet that provides a magnetic field in accordance with the varying electrical current. The accessory device may further include a magnet that provides a permanent magnetic field that interacts with the magnetic field of the electromagnet causing the coil to actuate relative to the magnet and acoustically drive the body to generate the acoustical energy.

In another aspect, an accessory device for carrying an electronic device is described. The accessory device may include an enclosure configured to provide a protective cover for the electronic device. The accessory device may further include an audio assembly disposed in the enclosure and configured to acoustically drive the enclosure to generate acoustical energy.

In another aspect, a method for assembling an accessory device configured to generate acoustical energy is described. The method may include inserting a magnet and a coil into a shell of the accessory device. The coil may be configured for receiving a varying electrical current to form an electromagnet that provides a magnetic field in accordance with the varying electrical current. The method may further include securing the coil with a body of the shell. In some embodiments, the electromagnetic is configured to interact with the magnetic field of the electromagnet causing the coil to actuate relative to the magnet and acoustically drive the body to generate the acoustical energy.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
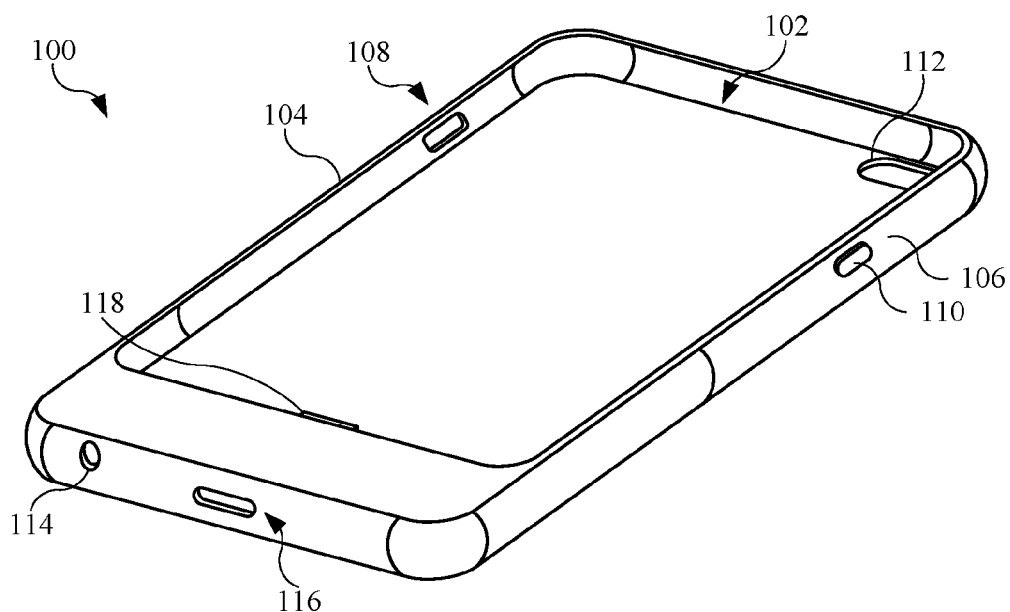
FIG. 1 illustrates an isometric view of an embodiment of an accessory device, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The described embodiments relate to an accessory device suitable for use with an electronic device. In this regard, the accessory device may be used as a protective cover. The accessory device may include several materials that define the protective cover. For example, the accessory device may include a shell that generally defines the shape of the accessory device. Also, the accessory device may include a fabric layer disposed over the shell, and in particular, over an interior region of the shell in a location of a receptacle that receives the electronic device. Also, the accessory device may include a flexible layer formed from silicone, or a silicone-based material, or, disposed over the shell, and in particular, over an exterior region of the shell in a location.

The accessory device may include additional features. For example, the accessory device may include an audio assembly integrated with the accessory device. The audio assembly may include a coil formed from an electrically conductive wire wound around a pole or other support structure. The audio assembly may further include a permanent magnet proximate to the coil. The coil may be electrically coupled with a power source such that the coil may receive electrical current to form an electromagnet. Further, the power source may provide a varying electrical current to the coil such that the coil forms an electromagnetic of a varying magnetic strength. Further, the varying electrical current from the power source may include power source may include an alternating electrical current such that the coil form an electromagnet of an alternative magnetic polarity, causing back-and-forth motion of the coil, in the form of a magnetic repulsion and attraction with respect to the permanent magnet. The coil may be coupled with a body such that the body is acoustically driven using the coil. Throughout this detailed description and in the claims, the phrase "acoustically drive," "acoustically driving," or "acoustically driven" refers to a body or structure(s) vibrated at a frequency (or in a range of frequencies) that generates acoustical energy in the form of an audible sound. Further, acoustical energy may include sound waves.

Unlike a traditional audio assembly that includes dedicated components to generate audible sound, the audio assembly described herein may rely on at least part of the accessory device to complete the audio assembly. For example, part of the shell may be used as the body that is acoustically driven to generate sound. Further, the flexible layer may facilitate the acoustically driven part and allow the part to be separate from a remaining portion of the shell. The flexible layer may also be acoustically driven in a location generally surrounding the acoustically driven part of the shell. In this manner, at least a portion of the shell and the flexible layer may be shared between the accessory device and the audio assembly, and the shell and the flexible layer are used both as a protective cover as well as an acoustically driven feature. This may also facilitate the audio assembly being integrated with the accessory device. In addition, in some embodiments, the audio assembly may be hidden from view due in part to the shell and the flexible layer.

These and other embodiments are discussed below with reference to FIGS. 1-14. However, those skilled in the art will readily appreciate that the detailed description given herein with respect to these Figures is for explanatory purposes only and should not be construed as limiting.

FIG. 1 illustrates an isometric view of an embodiment of an accessory device 100, in accordance with the described embodiments. The accessory device 100 may be designed to receive and secure an electronic device (not shown). In this regard, the accessory device 100 may include a receptacle 102 used as a space to receive an electronic device. The receptacle 102 may include a size and a shape corresponding to that of an electronic device. The receptacle 102 may be defined in part by several sidewalls of the accessory device 100. For example, the accessory device 100 may include a first sidewall 104 and a second sidewall 106, both of which may combine to engage an electronic device when the electronic device is disposed in the receptacle 102. The first sidewall 104 and the second sidewall 106 may include features that allow a user to interact with the electronic device when the electronic device is disposed in the receptacle 102. For example, as shown in FIG. 1, the first sidewall 104 may include an opening 108 in a location corresponding to a location of a switch or button (not shown) of an electronic device. Also, the second sidewall 106 may include a protruding feature 110 extending from the second sidewall 106, and in a location corresponding to a location of a switch or button (not shown) of an electronic device. While a specific embodiment is shown in FIG. 1, other configurations are possible. For example, the first sidewall 104 and/or the second sidewall 106 may include one or more openings or protruding features, similar to the opening 108 and the protruding feature 110, respectively. Also, the accessory device 100 may include an opening 112 in the receptacle 102. The opening 112 may be in a location corresponding to an image capture device (not shown) of an electronic device. The accessory device 100 may further include an opening 114 designed to receive an external device (not shown), such as an audio jack, that electrically couples with an electronic device.

Also, the accessory device 100 may include a port 116 designed to receive an external device (not shown), such as a cable assembly, that may provide communication (in the form of data) to the accessory device 100 and/or an electronic device disposed in the accessory device 100. In this regard, the accessory device 100 may further include a connector 118 designed to electrically couple with an electronic device. The connector 118 may allow the electronic device to receive communication and/or power from a cable assembly electrically coupled with the accessory device 100 by way of the port 116. Also, the accessory device 100 may include a compartment (not shown) designed to receive one or more structural components. In some embodiments, the compartment includes an internal power supply designed to receive and store electrical power to charge a battery of an electronic device. In the embodiment shown in FIG. 1, the compartment includes an audio assembly (not shown) designed to generate acoustical energy in the form of audible sound. The audio assembly may use one or more structural components of the accessory device 100 in order generate the audible sound. This will be shown and described below.

Figure 2:
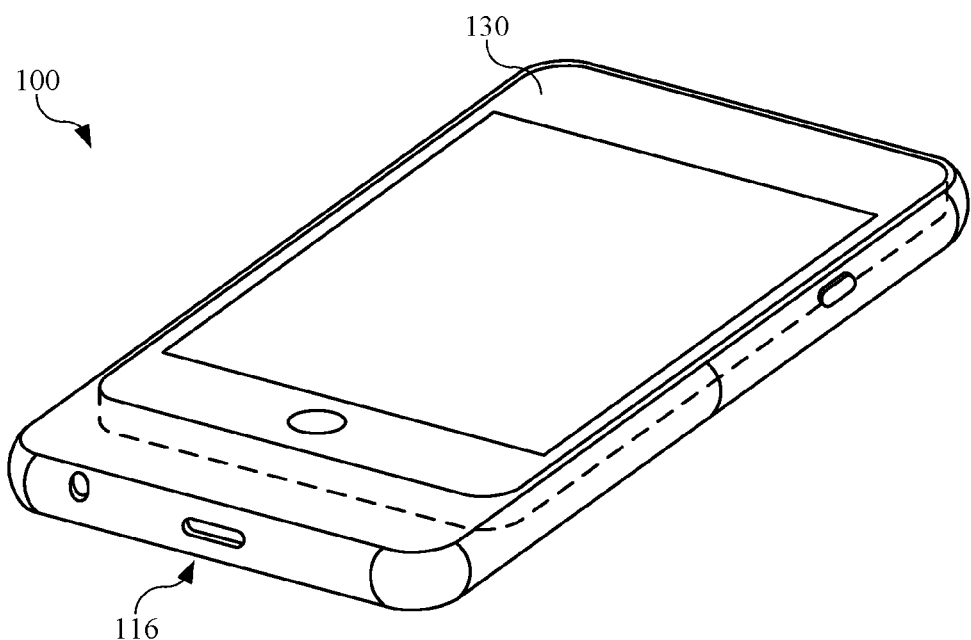
FIG. 2 illustrates an isometric view of the accessory device shown in FIG. 1, further showing an electronic device disposed in the accessory device.

FIG. 2 illustrates an isometric view of the accessory device 100 shown in FIG. 1, further showing an electronic device 130 disposed in the accessory device 100. The electronic device 130 may include, for example, a mobile communication device such as a smartphone. The electronic device 130 may be "releasably retained" by the accessory device 100, in that the electronic device 130 may be removed from and reinserted into the accessory device 100, without permanently altering the accessory device 100. Also, when the electronic device 130 is positioned in the accessory device 100 (as shown in FIG. 2), the electronic device 130 may include a port (not shown) that receives the connector 118 (shown in FIG. 1) of the accessory device 100, allowing the electronic device 130 to electrically couple with the accessory device 100, and further allowing the accessory device 100 and the electronic device 130 to communicate with each other. Further, in some embodiments, the electronic device 130 may be in communication with an operational component (not shown) disposed in the compartment previously described. The operational component may include an internal power supply that stores power in order to supply the power to a battery in the electronic device 130. Alternatively, or in combination, the operational component may include components used to form an audio driver, or audio speaker. This will be discussed further below.

Figure 3:
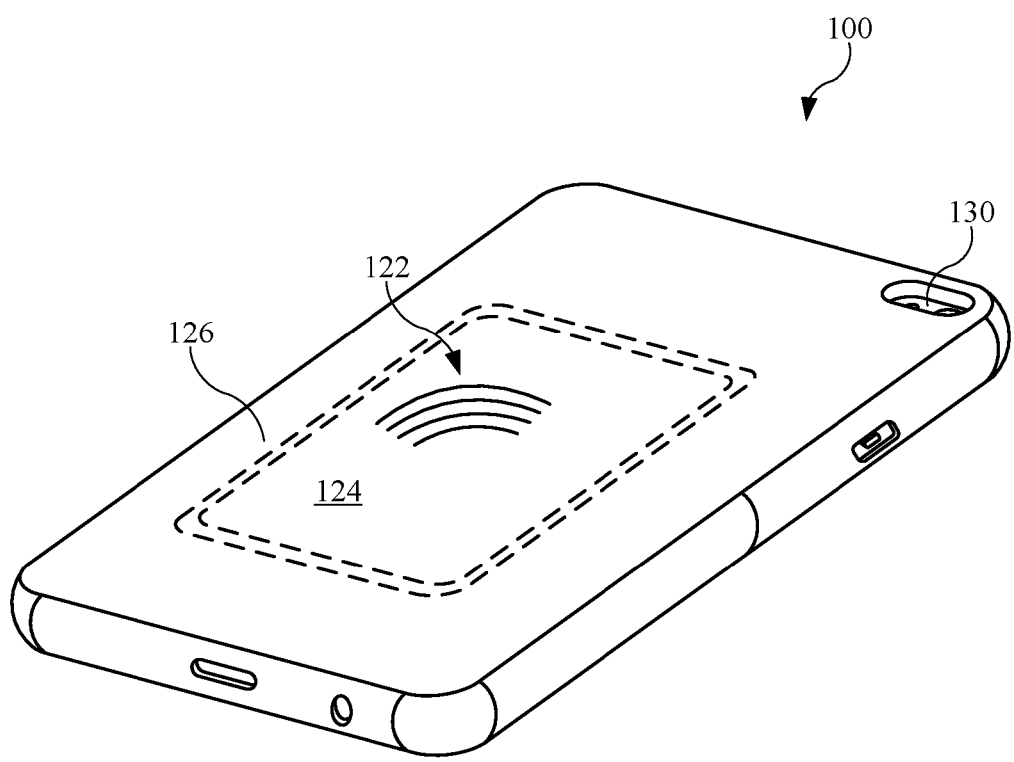
FIG. 3 illustrates an isometric rear view of the accessory device shown in FIG. 2, showing the accessory device generating an audio signal.

FIG. 3 illustrates an isometric rear view of the accessory device 100 shown in FIG. 2, showing the accessory device 100 generating acoustical energy (denoted by the curved lines 132) in the form of audible sound. As shown, the accessory device 100, and in particular, a first portion 124 of the accessory device 100, may be actuated or driven relative to a second portion 126 of the accessory device 100, causing the first portion 124 to vibrate and generate the audible sound. Also, the electronic device 130, disposed in the accessory device 100, may be electrically coupled with the components and may provide a command or control corresponding to an audio signal (or signals) that cause an audio assembly (not shown) to acoustically drive the first portion 124 to generate the audible sound.

Figure 4:
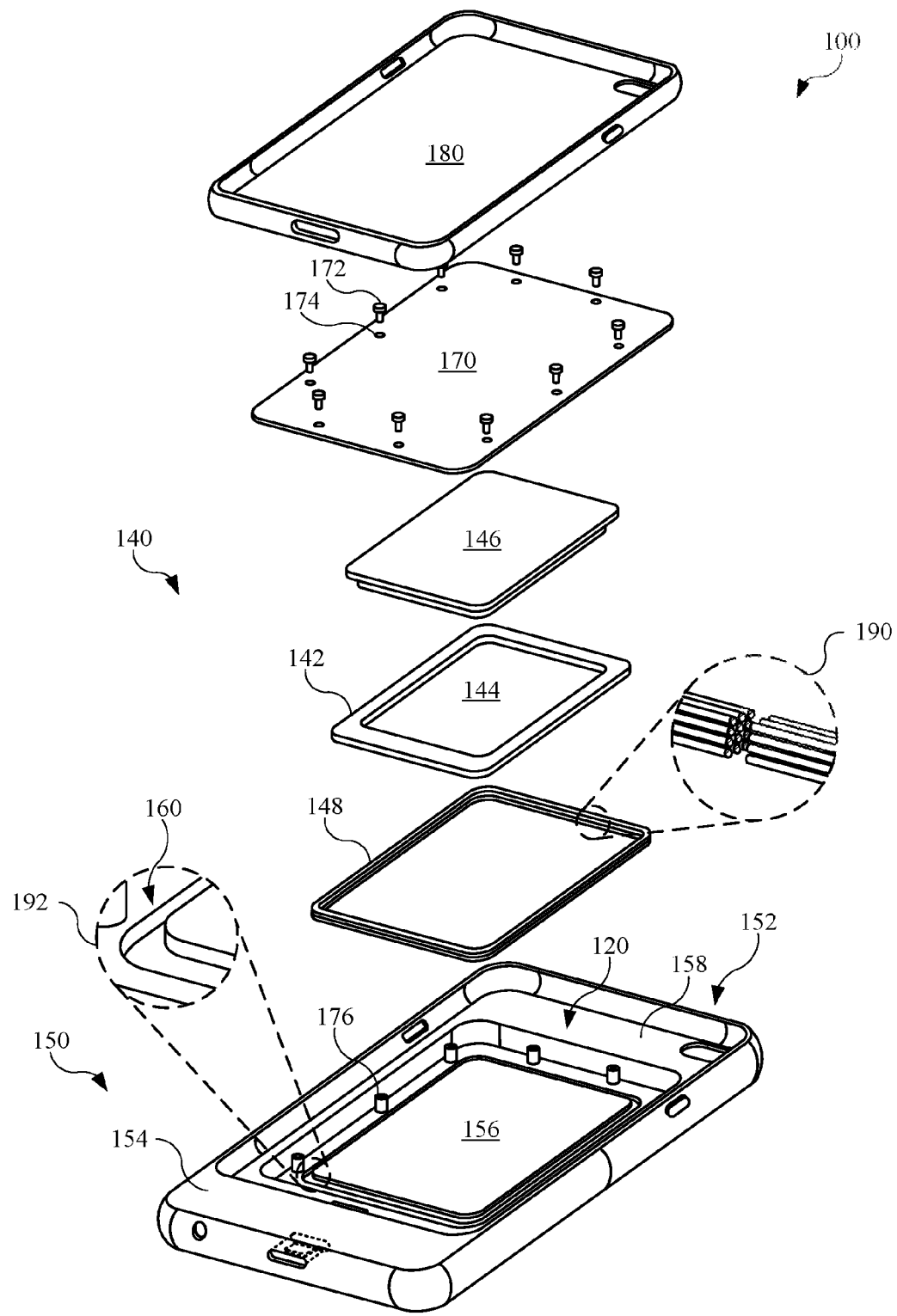
FIG. 4 illustrates an exploded view of the accessory device showing several structural features of an audio assembly, in accordance with the described embodiments.

FIG. 4 illustrates an exploded view of the accessory device 100 showing several structural features of an audio assembly 140, in accordance with the described embodiments. As shown, the audio assembly 140 may include a magnet 142. In some embodiments, the magnet 142 is a permanent magnet designed to provide a permanent magnetic field. The magnet 142 may be formed from alnico, ferrite, or generally any material (or materials) known in the art for forming a permanent magnet. In this regard, the magnet 142 may include a predetermined and fixed magnetic polarity arrangement. In some embodiments, the magnet 142 includes an opening 144. The opening 144 may allow the magnet 142 to secure with a magnet support 146, or pole. Also, the opening 144 may reduce the overall weight of the magnet 142. Also, the audio assembly 140 may include a coil 148 formed from an electrically conductive metal, such as aluminum or copper. A first enlarged view 190 shows a partial cross section of the coil 148, showing a wire wound several times. Although not shown, the coil 148 may be electrically coupled to a power source designed to supply power to the coil 148. The power source may be disposed in the accessory device 100. The power source may also be disposed in an electronic device (not shown), such as a battery, and may supply electrically current to the audio assembly 140 when the electronic device is electrically coupled with the accessory device 100.

The power source may supply a varying electrical current, causing the coil 148 to form an electromagnet having a varying magnetic field strength based on the electrical current supplied. Further, the power source may also supply an alternating (electrical) current, causing the coil 148 to form an electromagnet having alternating magnetic polarities. Further, the coil 148 may receive the alternating current in response to a command or control generated by an electronic device (not shown) electrically coupled with the accessory device 100, and in particular, electrically coupled with the coil 148. This will be shown and described below. While the first enlarged view 190 shows a particular number of winds, the number of winds may vary according to a desired magnetic field for an electromagnet formed by the coil 148.

When the audio assembly 140 is assembled, the coil 148 may be positioned within the magnetic field lines (not shown) of the magnet 142. Accordingly, the coil 148 may magnetically attract to and repel from the magnet 142 based on the coil 148 forming the electromagnet with alternating magnetic polarities. As a result, the coil 148 may be actuated back and forth with respect to the magnet 142. Also, the coil 148 may be secured with another feature of the accessory device 100, such as a body (discussed below), and may also be actuated in accordance with the coil 148. This movement of the body may cause the body to vibrate and produce acoustical energy in the form of audible sound. In other words, the body may be acoustically driven.

The accessory device 100 may include a base portion 150 that generally defines the size and shape of the accessory device 100. The base portion 150 may include a shell 152 surrounded by a flexible layer 154. The shell 152 may be formed from a molding operation, which may include an injection molding operation or a compression molding operation, as non-limiting examples. In this regard, the shell 152 may include a polymeric material, including plastic or polycarbonate, to provide a rigid body. The shell 152 may define the receptacle 102 (shown in FIG. 1) to receive an electronic device (not shown) as well as several sidewalls (as labeled in FIG. 1). Also, the shell 152 may define the compartment (not shown), including an interior volume of the compartment, which may receive several components (to be described below).

The shell 152 may partition into multiple, separate bodies. For example, as shown in FIG. 4, the shell 152 may include a first body 156, corresponding to the first portion 124 (shown in FIG. 3), and a second body 158 that may surround the first body 156. The first body 156 may define a "cone," or a structural feature actuated by the audio assembly 140. For example, the first body 156 may be secured with the coil 148 and may be actuated in accordance with the movement of the coil 148. Accordingly, the first body 156 may be acoustically driven, and vibrate to create the acoustical energy. As such, the first body 156 may be part of the audio assembly 140 as well as the accessory device 100. Further, the first body 156 may be actuated or driven relative to the second body 158. This will be shown below.

As shown in a second enlarged view 192, the first body 156 may separate from the second body 158 by a gap 160 characterized as a space or divide between the first body 156 and the second body 158. As shown, the gap 160 may extend around the first body 156 to separate the first body 156 from the second body 158. However, both the first body 156 and the second body 158 may be secured with the flexible layer 154. Although not shown, in other embodiments, the gap 160 partially separates the first body 156 from the second body 158.

In some embodiments, the first body 156 is formed from a material different than that of the second body 158. For example, the first body 156 may include a material of a first rigidity or hardness, and the second body 158 may include a material having a second rigidity or hardness different from that of the first body 156. This may enhance the acoustical performance of the audio assembly 140. However, in the embodiment shown in FIG. 4, the material forming the first body 156 also forms the second body 158. Although not shown, the shell 152 may undergo a cutting operation to partition the shell 152 into the first body 156 and the second body 158.

The flexible layer 154 may overlay the shell 152 along an exterior region of the shell 152, including the sidewalls. In some embodiments, the flexible layer 154 is formed over the exterior region of the shell 152 by a molding operation, such as an over molding operation, as a non-limiting example. The flexible layer 154 may include silicone or a silicone-based material. However, the flexible layer 154 may include other materials. The flexible layer 154 may surround the shell 152 and cover, or at least substantially cover, the shell 152. Also, the flexible layer 154 may also cover an exterior region of the compartment 120. The flexible layer 154 may vary in color to provide a cosmetic finish of the accessory device 100.

The flexible layer 154 may also be part of the audio assembly 140. For example, the flexible layer 154 may be actuated, along with the first body 156, in a location of the flexible layer 154 that covers the first body 156. In addition, the flexible layer 154 may also be actuated in a location between the first body 156 and the second body 158, such as a location corresponding to the gap 160. These features will be shown and described below.

In other to cover and contain certain components, the accessory device 100 may include a plate 170. As shown, the plate 170 may include several fasteners, such as a first fastener 172. The plate 170 may also include several openings, such as a first opening 174, with number of openings corresponding to the number of fasteners. The base portion 150, and particular, the second body 158, may include several receivers, such as a first receiver 176, with each receiver designed to receive one of the aforementioned fasteners. For example, the first fastener 172 may extend through the first opening 174 and secure with the first receiver 176. Although not shown, this may include a threaded engagement between the first fastener 172 and the first receiver 176. Also, the fasteners, when engaged with the receivers, may be flush, or co-planar, with respect to the plate 170. The plate 170, when secured with the base portion 150 via the fasteners, may cover and secure several components of the audio assembly 140.

The accessory device 100 may further include a fabric layer 180 that overlays the plate 170 and portions of the second body 158. The fabric layer 180 may be designed to receive and engage an electronic device (not shown). In some embodiments, the fabric layer 180 includes a microfiber layer. Although not shown, in other embodiments, the fabric layer 180 may be replaced by a layer of a different material that may engage the electronic device without causing damage to the electronic device.

The accessory device 100 having an audio assembly 140 integrated with the accessory device 100 offers several advantages over devices that include a separate (modular) audio assembly. For example, the audio assembly 140 may include less parts, as some parts of the accessory device 100, such as the first body 156 and the flexible layer 154, are shared with the audio assembly 140. This may reduce the overall manufacturing cost of the accessory device 100 as well as reduce the overall volume or space occupied by the accessory device 100. Also, although not shown, in some embodiments, the accessory device 100 may include an internal power supply that may supply electrical current to the audio assembly 140 and/or an electronic device (not shown) electrically coupled with the accessory device 100.

Figure 5:
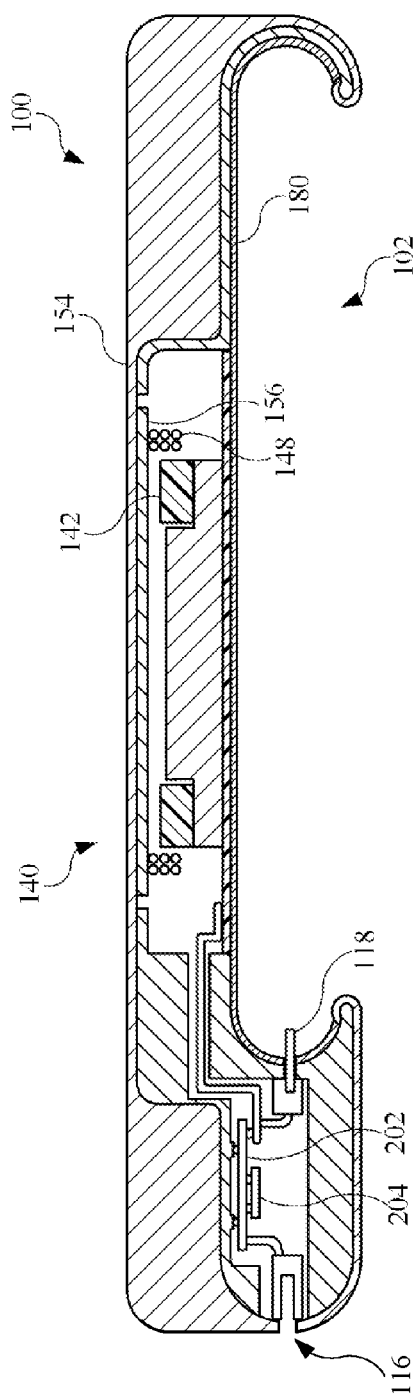
FIG. 5 illustrates a cross sectional view of the accessory device.

FIG. 5 illustrates a cross sectional view of the accessory device 100. As shown, the coil 148 may be secured with the first body 156. The securing means may include, as non-limiting examples, adhesives, fasteners, or the like. Also, the coil 148 may be in proximity to the magnet 142 such that the coil 148 is at least partially within the magnetic field lines (not shown) generated by the magnet 142. Also, as shown in FIG. 5, the flexible layer 154 may extend around and cover the exterior region of the shell 152, while the fabric layer 180 may cover an interior region defining the receptacle 102 that may receive an electronic device (not shown).

The shell 152 may include an additional interior region that carries several internal components of the accessory device 100. For example, the shell 152 may include a circuit board 202. The circuit board 202 may include a processor circuit 204 (and in some cases, several processor circuits) electrically coupled with the circuit board 202 and designed to process a signal (or signals) received by the circuit board 202 and also to execute one or more programs stored on a memory circuit (not shown) electrically coupled with the circuit board 202. For example, the processor circuit 204 may be used to control the alternating current delivered to the coil 148 to form an electromagnet. Also, in some embodiments, the processor circuit 204 is designed to process an audio signal (or signals) in order to generate the acoustical energy from the audio assembly 140.

By way of a cable assembly (shown, but not labeled), which may include a flexible circuit, the circuit board 202 may electrically couple with the port 116 to allow for communication between an external device (not shown) electrically coupled with the port 116 and the circuit board 202. Also, the circuit board 202 may be electrically coupled with the connector 118 by an additional cable assembly, allowing for communication between the circuit board 202 and an electronic device (not shown) electrically coupled with the connector 118. Also, an additional cable assembly may electrically couple the circuit board 202 with the coil 148. In this manner, the components (such as the processor circuit 204, the port 116, the connector 118, and the coil 148) in communication with the circuit board 202 may also be in communication with each other. Also, external devices electrically coupled with the port 116 and/or the connector 118 may be in communication with the circuit board 202.

Figure 6:
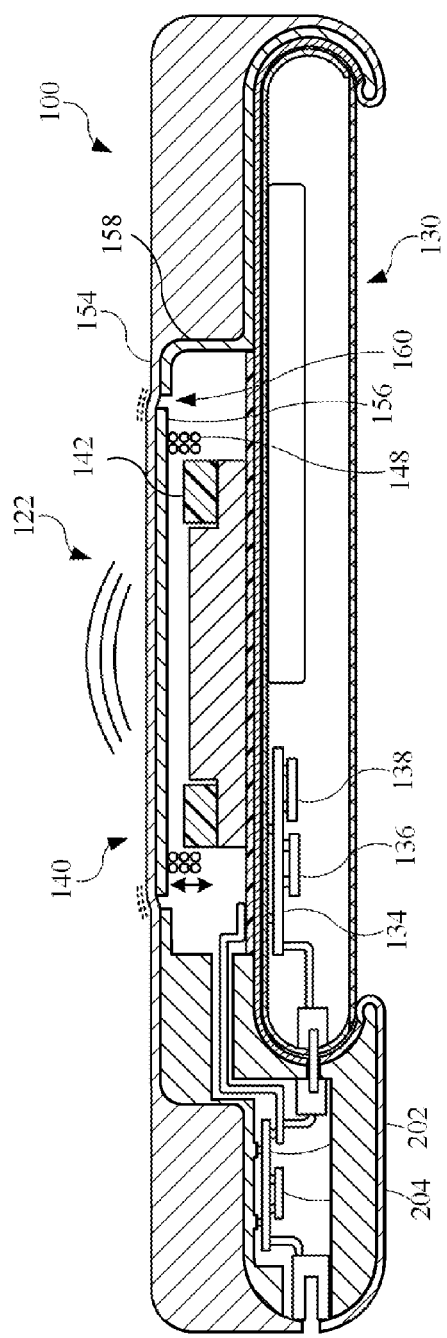
FIG. 6 illustrates a cross sectional view of the accessory device shown in FIG. 5, further showing the electronic device disposed in the accessory device.

FIG. 6 illustrates a cross sectional view of the accessory device 100 shown in FIG. 5, further showing the electronic device 130 disposed in the accessory device 100. In this configuration, the electronic device 130 may be electrically coupled with the accessory device 100, and accordingly, with the audio assembly 140. Also, as shown in FIG. 6, the audio assembly 140, using the coil 148, may acoustically drive the first body 156 based on the coil 148 forming an electromagnet having alternating magnetic polarities. The first body 156 (and in some cases, the first body 156 and a portion of the flexible layer 154) may vibrate at a frequency (or range of frequencies) to generate acoustical energy in the form of audible sound (denoted by the curved lines 122). Also, the relatively non-rigid nature of the flexible layer 154 (as compared to the first body 156) allows the coil 148 to move relative to the magnet 142. Further, the flexible layer 154 allows the first body 156 to move relative to the second body 158. In this manner, the first body 156, which is part of the accessory device 100, may be used as a "cone" of the audio assembly 140, and the flexible layer 154, which is also part of the accessory device 100, may be used as a "surround" of the audio assembly 140 in a location (or approximate location) associated with the gap 160.

Further, the electronic device 130 may include a circuit board 134 having a processor circuit 136 designed to generate a command or control sent to the processor circuit 204 in the accessory device 100 in order to control the current to the coil 148, and accordingly, to control the acoustical energy generated by the first body 156. In other words, the electronic device 130 may determine the audible sound generated by the audio assembly 140 of the accessory device 100. For example, the electronic device 130 may include a memory circuit 138 on the circuit board 134. The memory circuit 138 may store a media file (such as an audio media file or a video media file) having an audio component used by the electronic device 130 that is sent to the accessory device 100 to be played by the audio assembly 140 based on a command from the electronic device 130. Also, the communication from the electronic device 130 to the accessory device 100 may be in the form of an audio signal (or signals).

Figure 7:
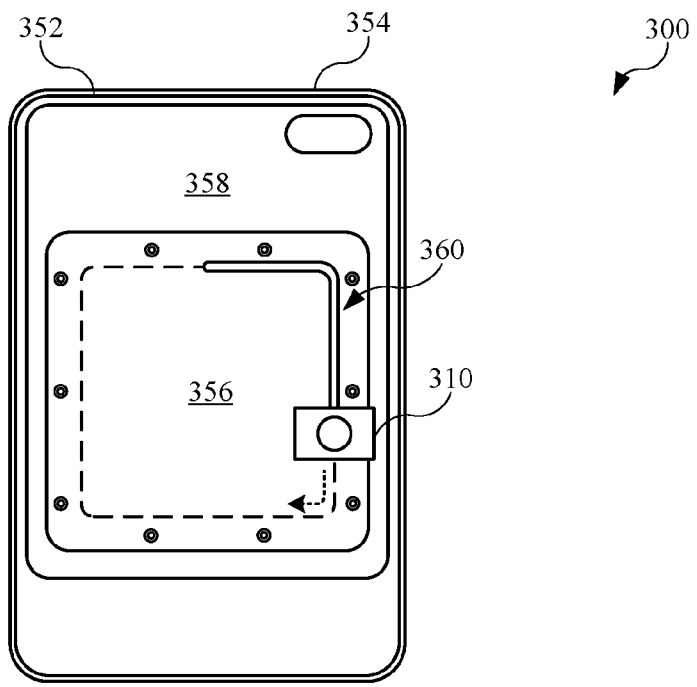
FIG. 7 illustrates a plan view of an embodiment of a shell of an accessory device undergoing a cutting operation to separate the shell into a first body and a second body, in accordance with the described embodiments.
Figure 8:
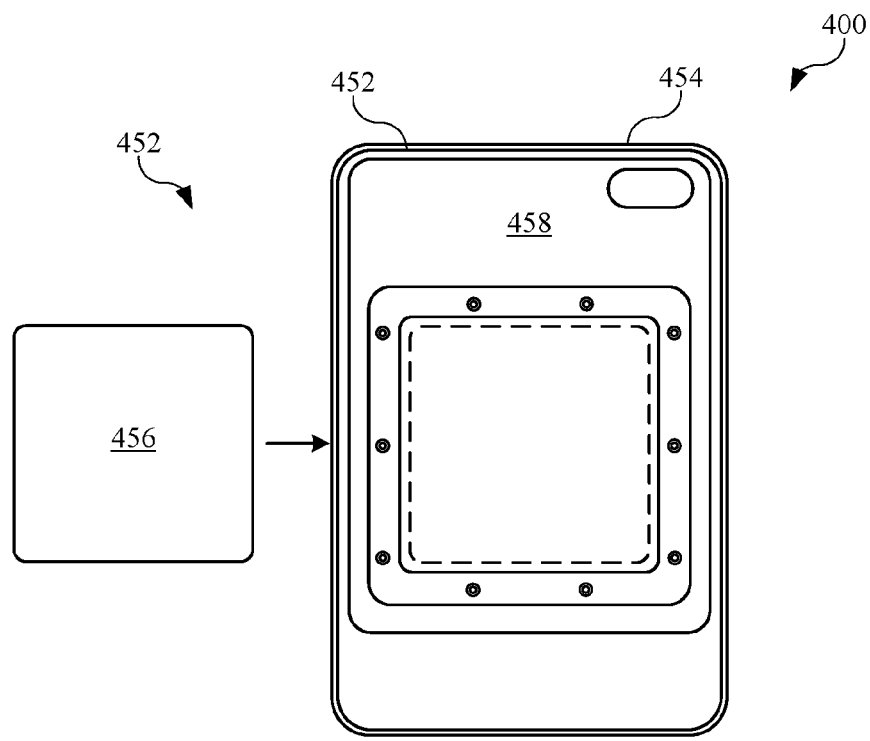
FIG. 8 illustrates a plan view of an embodiment of a shell of an accessory device receiving a feature that defines a first body, in accordance with the described embodiments.

FIGS. 7 and 8 illustrates a sub-manufacturing process performed on a shell of an accessory device. The shell may include any feature or features previously described for a shell. Further, FIGS. 7 and 8 illustrates alternate methods to forming a first body and a second body. FIG. 7 illustrates a plan view of an embodiment of a shell 352 of an accessory device 300 undergoing a cutting operation to separate the shell 352 into a first body 356 and a second body 358, in accordance with the described embodiments. As shown, a cutting tool 310 may cut the shell 352 to define the first body 356 and the second body 358. Also, the cutting tool 310 may cut the shell 352 even subsequent to a flexible layer 354 being molded to the shell 352. The cutting tool 310 may continue along the dotted lines to form a gap 360 between the first body 356 and the second body 358.

FIG. 8 illustrates a plan view of an embodiment of a shell 452 of an accessory device 400 receiving a feature that defines a first body 456, in accordance with the described embodiments. The first body 456 may be positioned along the dotted lines such that a second body 458 surrounds the first body 456. The first body 456 may be secured with a flexible layer 454 (surrounding the shell 452) by, for example, an adhesive. In some embodiments, the first body 456 may include a material (or materials) different from the second body 458. The rigidity, or stiffness, of the first body 456 may be selected to produce a desired acoustical energy by an audio assembly (not shown) that shares the first body 456 with the accessory device 400. For example, in some embodiments, the first body 456 is formed from a material (or materials) such that the first body 456 is more rigid than the second body 458. In other embodiments, the first body 456 is formed from a material (or materials) such that the first body 456 is less rigid than the second body 458. Accordingly, the first body 456 may be optimized for a desired acoustical performance. Further, in some embodiments, the first body 456 includes one or more layers of material to enhance the acoustic performance of an audio assembly (not shown) that shares the first body 456 with the accessory device 400. These layers may be used to, for example, dampen the acoustic energy.

Figure 9:
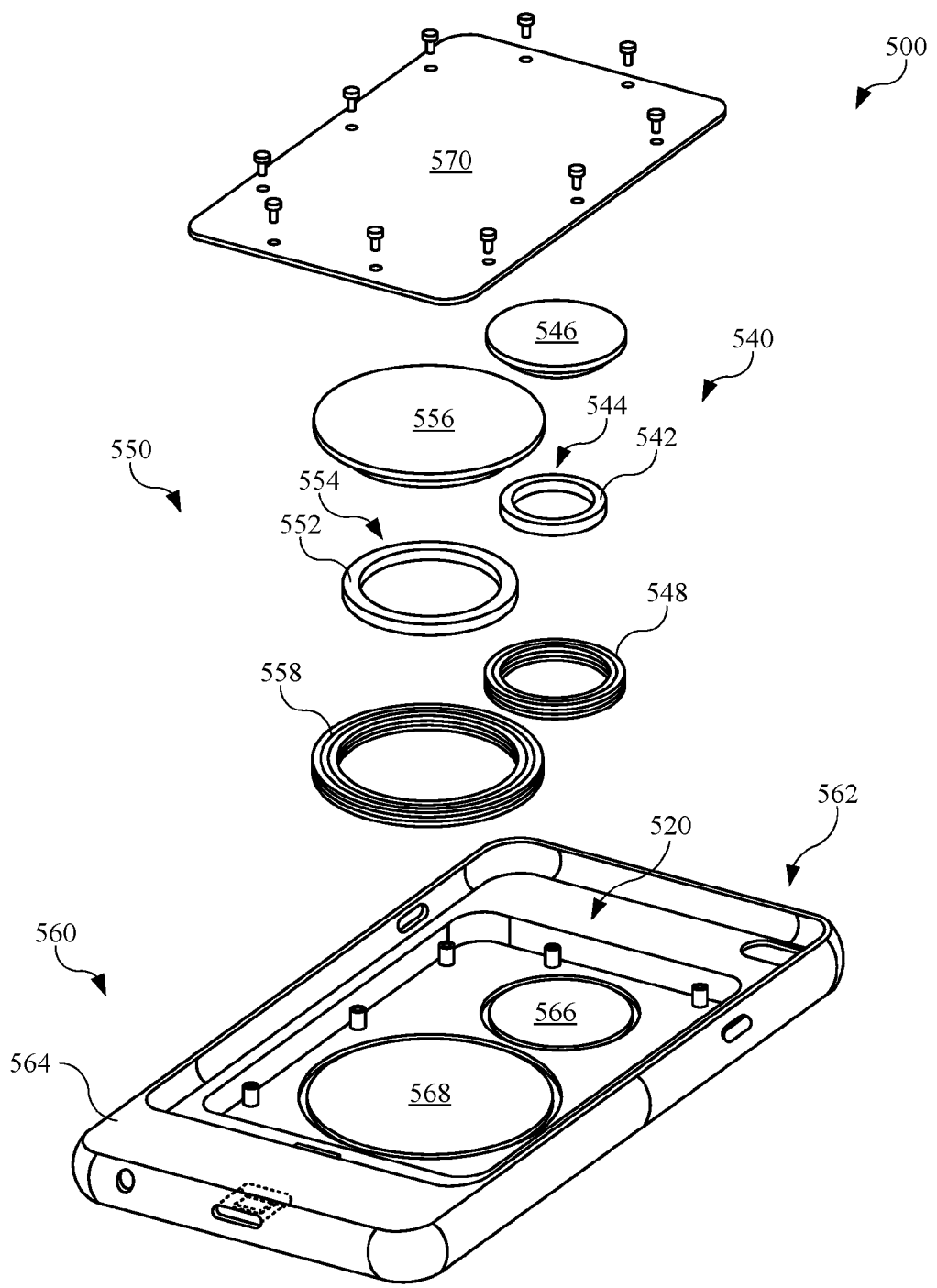
FIG. 9 illustrates an exploded view of an alternate embodiment of an accessory device showing several structural features designed to produce acoustical energy, in accordance with the described embodiments.

FIG. 9 illustrates an exploded view of an alternate embodiment of an accessory device 500 showing several structural features designed to produce acoustical energy, in accordance with the described embodiments. In some embodiments, the accessory device 500 may include multiple audio assemblies. For example, as shown in FIG. 9, the accessory device 500 incudes a first audio assembly 540 and a second audio assembly 550. As shown, the first audio assembly 540 may include a magnet 542 having an opening 544 to secure with a magnet support 546. Also, the first audio assembly 540 may include a coil 548 used to form an electromagnet by an alternating current in a manner previously described. The second audio assembly 550 may include a magnet 552 having an opening 554 to secure with a magnet support 556. Also, the second audio assembly 550 may include a coil 558 used to form an electromagnet by an alternating current in a manner previously described.

The accessory device 500 may include a base portion 560 having a shell 562 and a flexible layer 564 surrounding the shell 562. As shown, the shell 562 may include a first body 566 and a second body 568 shared by the first audio assembly 540 and the second audio assembly 550, respectively, in order to generate acoustical energy. For example, the coil 548 may secure with the first body 566, and when the coil 548 receives an alternating current, the coil 548 may magnetically attract to and repel from the magnet 542 causing the first body 566 to vibrate and generate acoustical energy in the form of audible sound. The second audio assembly 550 may function in a similar manner. Also, the first body 566 and the second body 568 may be secured with the flexible layer 564, with a first gap (shown, not labeled) formed between the first body 566 and the shell 562, and a second gap (shown, not labeled) formed between the second body 568 and the shell 562. Accordingly, the accessory device 500 may include structural components used to protect an electronic device (not shown) disposed in the accessory device 500 that are also part of an audio assembly. The material or materials used to form the shell 562, the flexible layer 564, and the first body 566 may include any material or materials previously described for their respective features. Also, the second body 568 may include a similar material (or materials) as that of the first body 566. However, the material of the second body 568 may differ from that of the first body 566 in order for the audio assemblies to generate different acoustical energy. Also, the first body 566 and the second body 568 may include similar or different materials as compared to the shell 562.

Having multiple audio assemblies may allow the accessory device 500 to deliver acoustical energy in different frequency ranges. As an example, the first audio assembly 540 may be designed to generate acoustical energy in a frequency range at or above 2,000 Hertz ("Hz"), commonly associated with a "tweeter" audio speaker. Further, the second audio assembly 550 may be designed to generate acoustical energy in a frequency range at or below 2,000 Hz, commonly associated with a "midrange" audio speaker. This allows the accessory device 500 to generate acoustical energy from audio assemblies designed for different frequency ranges, which may enhance the overall sound range of the accessory device 500. Further, in some embodiments (not shown), the accessory device 500 is modified to include a third audio assembly designed to generate acoustical energy in a frequency range at or below 200 Hz, commonly associated with a "woofer" audio speaker. Also, the accessory device 500 may include a plate 570 having several fasteners (shown, not labeled) designed to secure with receivers (shown, not labeled) of the shell 562 in order to enclose the first audio assembly 540 and the second audio assembly 550 in an interior volume defined by a compartment 520. Although not shown, the accessory device 500 may include a fabric layer disposed over the plate 570 and designed to engage an electronic device disposed in the accessory device 500. Also, although not shown, the accessory device 500 may include any internal component (such as a processor circuit, circuit board, and cable assemblies) shown and described for an accessory device 100 (in FIG. 4).

Also, although not shown, the first body 566 and/or the second body 568 may include an angled surface. In other words, the first body 566 and/or the second body 568 may include a surface that is not parallel to a horizontal plane. In this manner, acoustical energy generated by the first body 566 and/or the second body 568 having an angled surface may direct the acoustical an energy at an angle other than a normal angle (or right angle) with respect to the accessory device 500, and the accessory device 500 may generate directional acoustical energy. It will be appreciated that the angle of the directed acoustical energy corresponds to the angle formed by the non-planar surface of the first body 566 and/or the second body 568 when these bodies include an angled surface.

Figure 10:
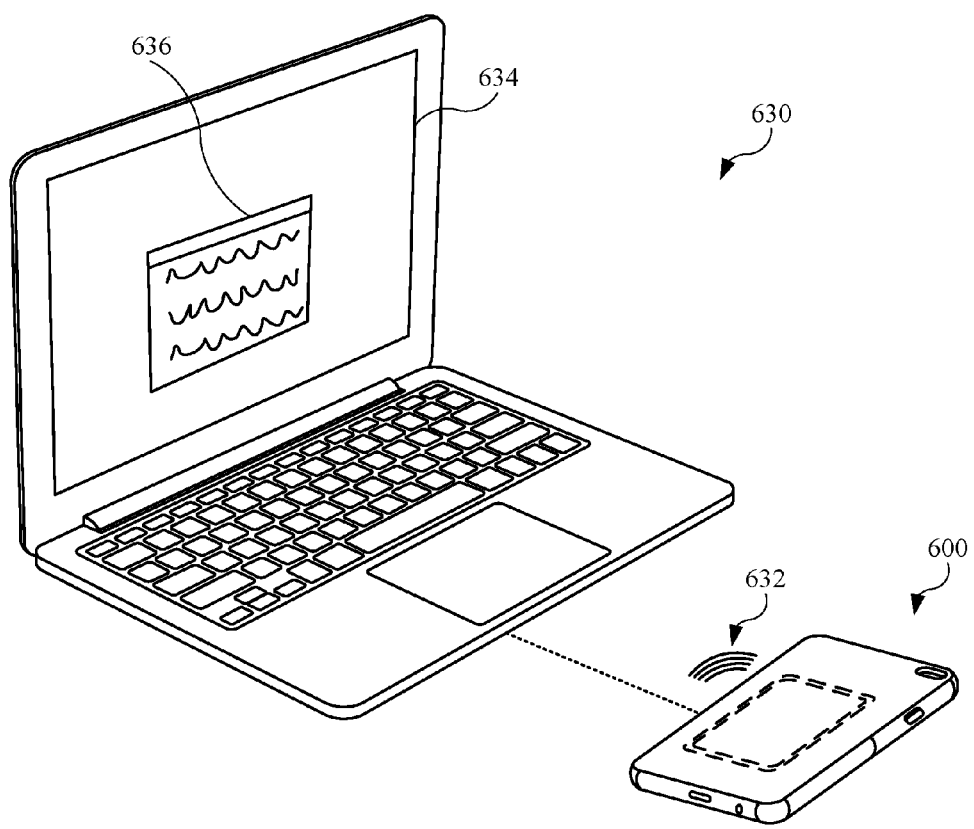
FIG. 10 illustrates an isometric view of an embodiment of an accessory device in communication with an embodiment of an electronic device, in accordance with the described embodiments.

Several embodiments show and describe an accessory device acoustically driven by an electronic device positioned in, and directly connected with, the accessory device. However, some accessory devices may be designed to operate not only in direct communication with the electronic device, but also through wireless communication with the electronic device. Further, the accessory device may be acoustically driven by an external electronic device that is not positioned in the accessory device. For example, FIG. 10 illustrates an isometric view of an embodiment of an accessory device 600 in communication with an embodiment of an electronic device 630, in accordance with the described embodiments. In some embodiments, the electronic device 630 is smartphone designed for mobile communication. In the embodiment shown in FIG. 10, the electronic device 630 is a laptop computer device. The accessory device 600 may include a radio circuit, or circuits (not shown), disposed in the accessory device 600 and designed for wireless communication (such as Wi-Fi and/or Bluetooth communication) with the electronic device 630 (also having one or more radio circuits). In this manner, the accessory device 600 may not require an electronic device, such as an electronic device 130 (shown in FIG. 3), disposed in the accessory device 600, and the accessory device 600 may receive wireless commands or controls based on the communication with the electronic device 630.

The electronic device 630 may include a display assembly 634 that displays a program 636 that allows a user to interact with the electronic device. The program 636 may be stored on a memory circuit (not shown) and run by a processor circuit (not shown), with the memory circuit and the processor circuit stored in the electronic device 630. In this manner, the electronic device 630 may send a command or control to the accessory device 600 that causes the accessory device 600 to generate acoustical energy in the form of audible sound (shown as curved lines 632). The command may include a command to play a media file stored on the memory circuit. Also, these commands or controls may be in the form of an audio signal (or signals). The accessory device 600 may include any structure (or structures) and any feature (or features) previously described for an accessory device.

Figure 11:
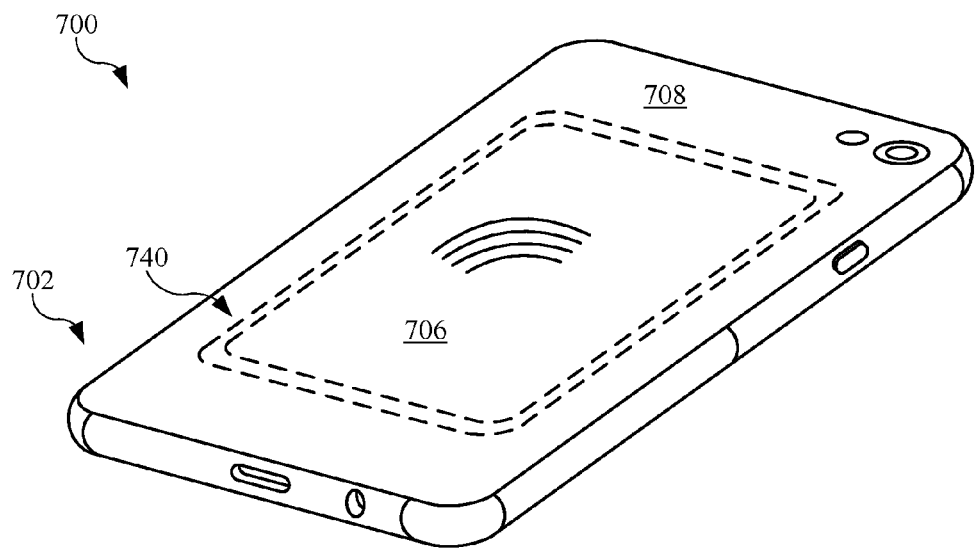
FIG. 11 illustrates an isometric rear view of an embodiment of an electronic device having an audio assembly disposed in the electronic device, in accordance with the described embodiments.
Figure 12:
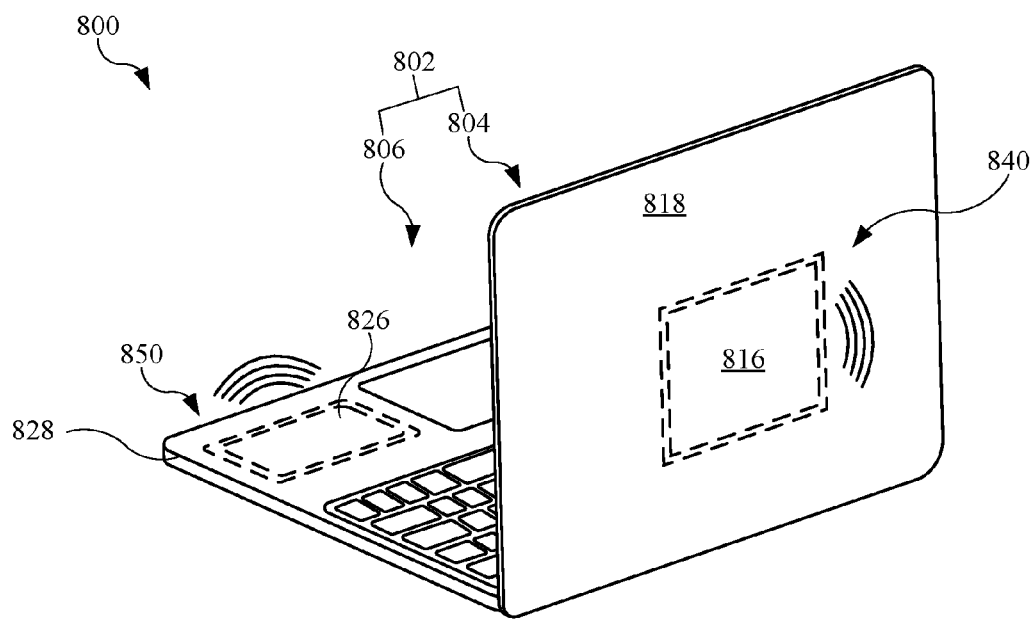
FIG. 12 illustrates an isometric rear view of an alternate embodiment of an electronic device having an audio assembly disposed in the electronic device, in accordance with the described embodiments.
Figure 13:
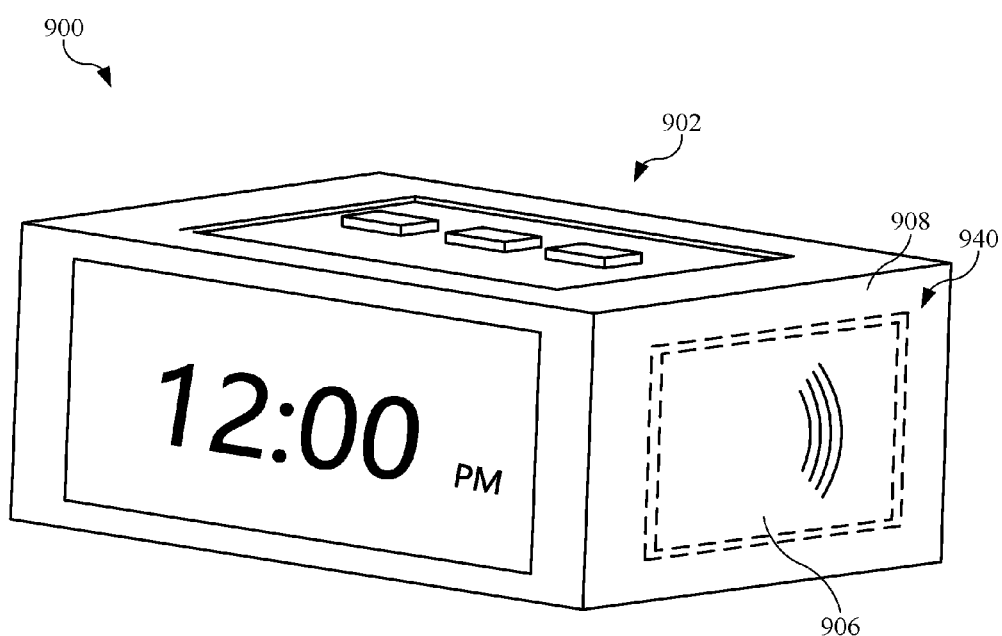
FIG. 13 illustrates an isometric view of an alternate embodiment of an electronic device having an audio assembly disposed in the electronic device, in accordance with the described embodiments.

While previous embodiments illustrate an accessory device having an integrated audio assembly, FIGS. 11-13 illustrate an electronic device that may include an audio assembly integrated with an enclosure, or housing component, of an electronic device such that a portion of the enclosure is shared by the audio assembly. Although not explicitly shown, the audio assemblies described in electronic devices shown in FIGS. 11-13 may include any structure (or structures) and any feature (or features) previously described, including an audio assembly or audio assemblies, for an accessory device.

FIG. 11 illustrates an isometric rear view of an embodiment of an electronic device 700 having an audio assembly 740 disposed in the electronic device 700, in accordance with the described embodiments. The electronic device 700 may include, for example, a mobile communication device (such as a smart phone) or a tablet device. The electronic device 700 may include an enclosure 702, which may include plastic or metal. The enclosure 702 may also include a flexible layer (not labeled). The enclosure 702 may be separated into a first body 706 and a second body 708 separate from the first body 706. The audio assembly 740 may acoustically drive the first body 706 of the electronic device 700 to generate acoustical energy in the form of audible sound. Accordingly, the enclosure 702 and the audio assembly 740 may share the first body 706. Also, the first body 706 may be secured with the flexible layer, allowing the first body 706 to move relative to the second body 708. The flexible layer may allow the first body 706 to move relative to the second body 708, and in some cases, may be acoustically driven with the first body 706.

FIG. 12 illustrates an isometric rear view of an alternate embodiment of an electronic device 800 having multiple audio assemblies disposed in the electronic device 800, in accordance with the described embodiments. The electronic device 800 may include, for example, a laptop computer device. The electronic device 800 may include an enclosure 802, which may include plastic or metal. The enclosure 802 may include a display housing 804 coupled to a base portion 806, with the display housing 804 being rotatable with respect to the base portion 806, and vice versa. Both the display housing 804 and the base portion 806 may include a flexible layer (not labeled).

The display housing 804 may be separated into a first body 816 and a second body 818 separate from the first body 816. The electronic device 800 may include a first audio assembly 840 designed to acoustically drive the first body 816 of the electronic device 800. Also, the first body 816 may be secured with the flexible layer, and the flexible layer may allow the first body 816 to move relative to the second body 818. The first audio assembly 840 may be designed acoustically drive the first body 816 to generate acoustical energy in the form of audible sound. Accordingly, the display housing 804 and the first audio assembly 840 may share the first body 816. The flexible layer may allow the first body 816 to move relative to the second body 818, and in some cases, may be acoustically driven with the first body 816. The base portion 806 may also include a first body 826, a second body 828, and a second audio assembly 850. The second audio assembly 850 may be designed to acoustically drive the first body 826 to generate acoustical energy in the form of audible sound in a manner similar to that of the first audio assembly 840 and first body 816, respectively, of the display housing 804.

FIG. 13 illustrates an isometric view of an alternate embodiment of an electronic device 900 having an audio assembly 940 disposed in the electronic device 900, in accordance with the described embodiments. The electronic device 900 may include, for example, an alarm clock. The electronic device 900 may include an enclosure 902, which may include plastic or metal. The enclosure 902 may also include a flexible layer (not labeled). The enclosure 902 may be separated into a first body 906 and a second body 908 separate from the first body 906. The audio assembly 940 may acoustically drive the first body 906 of the electronic device 900 to generate acoustical energy in the form of audible sound. Accordingly, the enclosure 902 and the audio assembly 940 may share the first body 906. Also, the first body 906 may be secured with the flexible layer, with the flexible layer the first body 906 to move relative to the second body 908.

Figure 14:
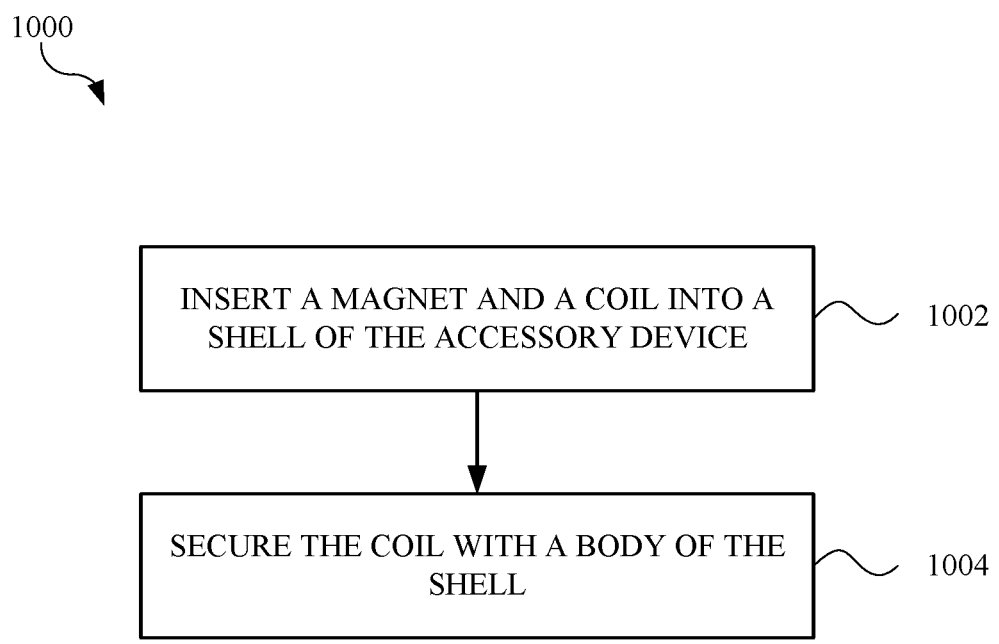
FIG. 14 illustrates a flowchart showing a method for assembling an accessory device configured to generate an audio signal, in accordance with the described embodiments.

FIG. 14 illustrates a flowchart 1000 showing a method for assembling an accessory device configured to generate an acoustical energy, in accordance with the described embodiments. The method may be used to form, at least in part, any accessory device previously described. Further, in some cases, the method may be adopted to form, at least in part, an electronic device shown and described in FIGS. 11-13.

In step 1002, an audio assembly may be inserted into an enclosure of the accessory device. The audio assembly may include a magnet and a coil. The coil may be configured for communication with an electronic device. Also, the coil may be electrically coupled with a power source that delivers an alternating electrical current to the coil, causing the coil to form an electromagnet having alternating magnetic polarities. This may cause the coil, as an electromagnet, to magnetically attract to and repel from the magnet.

In step 1002, a magnet and a coil are inserted into a shell of the accessory device. The coil may be configured for receiving a varying electrical current to form an electromagnet that provides a magnetic field in accordance with the varying electrical current.

The shell may include multiple bodies. In some cases, the accessory device may also include a flexible layer surrounding an exterior region of the shell. Also, the coil may be configured for communication with an electronic device. In some cases, the electronic device is in communication with the coil and other components of the accessory device when the electronic device is disposed in the accessory device. In other cases, the electronic device may be in wireless communication with the accessory device, including the coil. This may cause the coil, as an electromagnet, to magnetically attract to and repel from the magnet.

In step 1004, the coil is secured with a body of the shell. Securing means may include adhesives, fasteners, clips, etc. Also, the electromagnetic is configured to interact with the magnetic field of the electromagnet causing the coil to actuate relative to the magnet and acoustically drive the body to generate the acoustical energy. Further, in some embodiments, based on a command from an electronic device, the coil may receive the alternating electrical current to form the electromagnetic that is actuated relative to the magnet to acoustically drive the body to generate the acoustical energy.

Also, enclosure may include a shell formed form a polymer. A flexible layer may the shell and secure with the body and the second body. The flexible layer may allow the body to move with respect to the second body. Further, the body may be used as a cone of the audio assembly that is acoustically driven, and the flexible layer may be used as a surround of the audio assembly. In this manner, the accessory device and the audio assembly may share the body and the flexible layer.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory device, comprising:
a shell configured to carry an electronic device, the shell comprising a first portion and a second portion surrounding the first portion;
an audio assembly coupled with the first portion and configured to generate
a vibration to the first portion relative to the second portion, the vibration generating acoustical energy; and
an outer layer covering the first portion and the second portion, wherein the outer layer flexes in accordance with the vibration of the first portion.

2. The accessory device of claim 1, wherein the audio assembly comprises:
a coil coupled with the first portion and configured to receive a varying electrical current to form an electromagnet that provides an external magnetic field in accordance with the varying electrical current; and
a magnet that provides a permanent magnetic field that interacts with the external magnetic field of the electromagnet causing the coil to actuate relative to the magnet and acoustically drive the first portion to generate the acoustical energy.

3. The accessory device of claim 2, wherein the outer layer comprises silicone.

4. The accessory device of claim 2, wherein the shell and the outer layer define several sidewalls to form a receptacle configured to releasably retain the electronic device.

5. The accessory device of claim 2, wherein the shell comprises an interior volume that defines a compartment to receive the coil and the magnet.

6. The accessory device of claim 2, wherein when the electronic device is retained in the shell, the electronic device is configured to generate a command such that the coil receives the varying electrical current to form the electromagnet to acoustically drive the first portion to generate the acoustical energy.

7. The accessory device of claim 1, wherein the first portion is shared between the audio assembly and the shell such that the first portion also defines a portion of a protective cover for the electronic device.

8. An accessory device for carrying an electronic device, the accessory device comprising:
an enclosure configured to provide a protective cover for the electronic device, the enclosure including several sidewalls that at least partially define a receptacle that receives the electronic device;

an audio assembly disposed in the enclosure and configured to acoustically drive the enclosure to generate acoustical energy; and a fabric layer that covers at least some of the several sidewalls and the receptacle.

9. The accessory device of claim 8, wherein the enclosure comprises:

a first body acoustically driven by the audio assembly;

a second body surrounding the first body; and a flexible layer disposed over the first body and the second body, wherein the flexible layer defines a surround at a gap between the first body and the second body.

10. The accessory device of claim 9, wherein the audio assembly comprises:

a coil configured for communication with the electronic device; and a magnet, wherein based on a command from the electronic device, the coil is configured to receive electrical current to form an electromagnet that is actuated with respect to the magnet to acoustically drive the first body and the flexible layer with respect to the second body to generate the acoustical energy.

11. The accessory device of claim 8, further comprising:

a receptacle configured to receive the electronic device; and a compartment that receives the audio assembly.

12. The accessory device of claim 11, further comprising a connector at least partially positioned in the receptacle to electrically couple with the electronic device.

13. The accessory device of claim 12, wherein the connector, when electrically coupled with the electronic device, is configured to relay communication to the audio assembly from the electronic device to acoustically drive the enclosure.

14. The accessory device of claim 8, further comprising a connector located in the receptacle, the connector configured to electrically couple to the electronic device.

15. A method for assembling an accessory device, the method comprising:

providing a shell configured to carry an electronic device, the shell comprising a first portion and a second portion separate from the first portion;

coupling an audio assembly with the first portion, the audio assembly configured to generate a vibration to the first portion relative to the second portion, the vibration generating acoustical energy; and covering the first portion and the second portion with an outer layer, wherein the outer layer flexes in accordance with the vibration of the first portion.

16. The method of claim 15, wherein coupling the audio assembly with the first portion: secure a coil with the first portion, the coil configured for receiving a varying electrical current to form an electromagnet that provides an external magnetic field in accordance with the varying electrical current; and positioning a magnet that provides a permanent magnetic field that interacts with the external magnetic field of the electromagnet causing the coil to actuate relative to the magnet and acoustically drive the first portion to generate the acoustical energy.

17. The method of claim 15, wherein covering the outer layer comprises over molding a flexible layer over the first portion and the second portion.

18. The method of claim 16, wherein providing the shell that comprises the first portion and the second portion comprises cutting the shell to define the first portion and the second portion.

19. The method of claim 16, wherein the shell comprises a molded polymer.

20. The method of claim 15, further comprising:

forming several sidewalls that define a receptacle; and disposing a fabric layer over the receptacle and the several sidewalls, wherein the receptacle and the fabric layer combine to receive an electronic device capable of providing a control to the accessory device to generate the acoustic energy.

* * * * *